United States Patent [19]

Fujioka

[11] Patent Number: 4,589,076

[45] Date of Patent: May 13, 1986

[54] METHOD FOR CONTROLLING STRETCHING AND CONTRACTING OPERATIONS OF TELESCOPIC MULTISTAGE BOOM

[75] Inventor: Jun Fujioka, Akashi, Japan

[73] Assignee: Kabushiki Kaisha Kobe Seiko Sho, Kobe, Japan

[21] Appl. No.: 542,489

[22] Filed: Oct. 17, 1983

[51] Int. Cl.[4] ........................ G06F 15/20; B66C 23/00

[52] U.S. Cl. .................................... 364/508; 364/463; 340/685; 212/151

[58] Field of Search ............... 364/508, 424, 562, 463; 340/685; 212/150, 151, 155; 91/168, 530; 52/115, 118

[56] References Cited

U.S. PATENT DOCUMENTS

| | | | |
|---|---|---|---|
| 3,809,248 | 5/1974 | Ohniwa et al. | 52/115 |
| 3,922,789 | 12/1975 | Sarrell | 340/685 |
| 4,125,974 | 11/1978 | Kay et al. | 91/530 |
| 4,178,591 | 12/1979 | Geppert | 340/685 |
| 4,185,280 | 1/1980 | Wilhelm | 364/508 |
| 4,236,864 | 12/1980 | Couture et al. | 340/685 |
| 4,395,706 | 7/1983 | Garber | 340/685 |
| 4,456,093 | 6/1984 | Finley et al. | 212/155 |

*Primary Examiner*—Gary Chin

*Attorney, Agent, or Firm*—Oblon, Fisher, Spivak, McClelland & Maier

[57] ABSTRACT

A method for controlling operating cylinders in extending and contracting operations of a multistage telescopic boom including a base boom portion, an intermediate boom portion and a fore boom portion, the method including the steps of detecting the length of the boom by means of a boom length detector; permitting extension or contraction of a cylinder of the intermediate boom portion alone when the value (l) of a detected length is smaller than a first preset reference value (L−β) which is determined by subtracting a preset arbitrary length (β) from an actual length (L) of a boom with the intermediate boom portion fully extended relative to the base boom portion and a fore boom portion fully contracted relative to the intermediate boom portion; permitting extension or contraction of a cylinder of the fore boom portion alone when the detected value (l) is greater than a second preset reference value (L+β); detecting a variation per unit time of the detected value (l) when the value (l) is in the range between the first and second reference values (L−β) and (L+β); continuing the boom extension or contraction by a currently operating cylinder while the variation is greater than a predetermined value; and switching the operation to the boom extension or contraction by a cylinder of the next stage as soon as the variation becomes smaller than the predetermined value.

5 Claims, 5 Drawing Figures

15
15A
15B
P
T
B4.B5
A1
B1
E N R
16
27
18
17
11
12
B2 A4
A5
A2
B4
B5
10
9
8
7
A6
A3
14
13
B3
5
5a
5b
4
4a
4b
3
2
1
6
6a
6b
L
S
-β
+β

METHOD FOR CONTROLLING STRETCHING AND CONTRACTING OPERATIONS OF TELESCOPIC MULTISTAGE BOOM

BACKGROUND OF THE INVENTION

1. Field of the Invention:

This invention relates to a method for controlling the telescopic extending and contracting operations of a multistage boom of a crane or the like in an efficient manner.

2. Description of the Prior Art:

Multistage booms generally used on cranes or the like are of the telescopic type, which have their modulus of section reduced gradually toward the fore end of the telescopic boom portions and which are designed to extend firstly a boom portion with the largest modulus of section in an extending operation from the standpoint of the boom strength and to contract firstly a boom portion with the smallest modulus of section in a contracting operation to ensure a rated capacity. Therefore, in controlling the extending and contracting operations of a three-stage boom, for example, the ideal procedure is to extend and contract the telescopic boom portions successively, extending the fore boom portion after the intermediate boom portion is fully extended in the extending operation, and contracting the intermediate boom portion after complete contraction of the fore boom portion in the contracting operation.

With such a multistage boom, it has been the conventional practice to resort to a method of detecting the fully extended state of the intermediate boom portion or the fully contracted state of the fore boom portion by means of a limit switch and switching an electromagnetic valve in a hydraulic control circuit of boom operating cylinders in response to a logic signal with regard to the position of an operating lever, or a method which, in order to preclude errors in the switching operation of the boom operating cylinders, feeds the fluid pressure also to the cylinder of the intermediate boom portion (normally at the stroke end) at the time of extension of the fore boom portion, feeding the fluid pressure even to the cylinder of the fore boom portion (normally at the stroke end) when contracting the intermediate boom portion. Of these conventional methods, the former method is costly since it necessitates providing a take-up reel for winding the electric cables which connect the limit switches to the electromagnetic valve in relation with the telescopic operation of the boom, in addition to the above-mentioned two limit switches for detecting the fully extended state of the intermediate boom portion and the fully contracted state of the distal boom portion, respectively. On the other hand, the latter method incurs a problem in that it likewise requires provision of costly boom operating cylinders and a hydraulic control circuit of complicated construction.

SUMMARY OF THE INVENTION

It is therefore an object of the present invention to provide a method for controlling the telescopic extending and contracting operation of a multistage boom, which can eliminate the above-mentioned drawbacks or problems in an inexpensive manner without necessitating alterations in construction of the boom and cylinders.

It is a more particular object of the present invention to provide a method for controlling the telescopic operation of a multistage boom, which can efficiently and safely extend and contract the boom by switching the operating cylinders of the fore and intermediate boom portions with accurately controlled timing.

According to the present invention, there is provided a method for controlling operating cylinders in extending and contracting operations of a multistage telescopic boom including a base boom portion, an intermediate boom portion and a fore boom portion, the method comprising: detecting the length of the boom by means of a boom length detector, permitting extension or contraction of a cylinder of the intermediate boom portion alone when the value (l) of a detected length is smaller than a first preset reference value $(L-\beta)$ which is determined by subtracting a preset arbitrary length $(\beta)$ from an actual length (L) of a boom with the intermediate boom portion fully extended relative to the base boom portion and a fore boom portion fully contracted relative to the intermediate boom portion; permitting extension or contraction of a cylinder of the fore boom portion alone when the detected value (l) is greater than a second preset reference value $(L+\beta)$; detecting variation per unit time of the detected value (l) when the value (l) is in the range between the first and second reference values $(L-\beta)$ and $(L+\beta)$; continuing boom extension or contraction by a currently operating cylinder while the variation is greater than a predetermind value; and switching operation to the boom extension or contraction by a cylinder of the next stage as soon as the variation becomes smaller than the predetermined value.

The above and other objects, features and advantages of the present invention will become apparent from the following description and the appended claims, taken in conjunction with the accompanying drawings which show by way of example some illustrative embodiments of the invention.

DESCRIPTION OF THE PREFERRED EMBODIMENTS

Figures 1, 2:
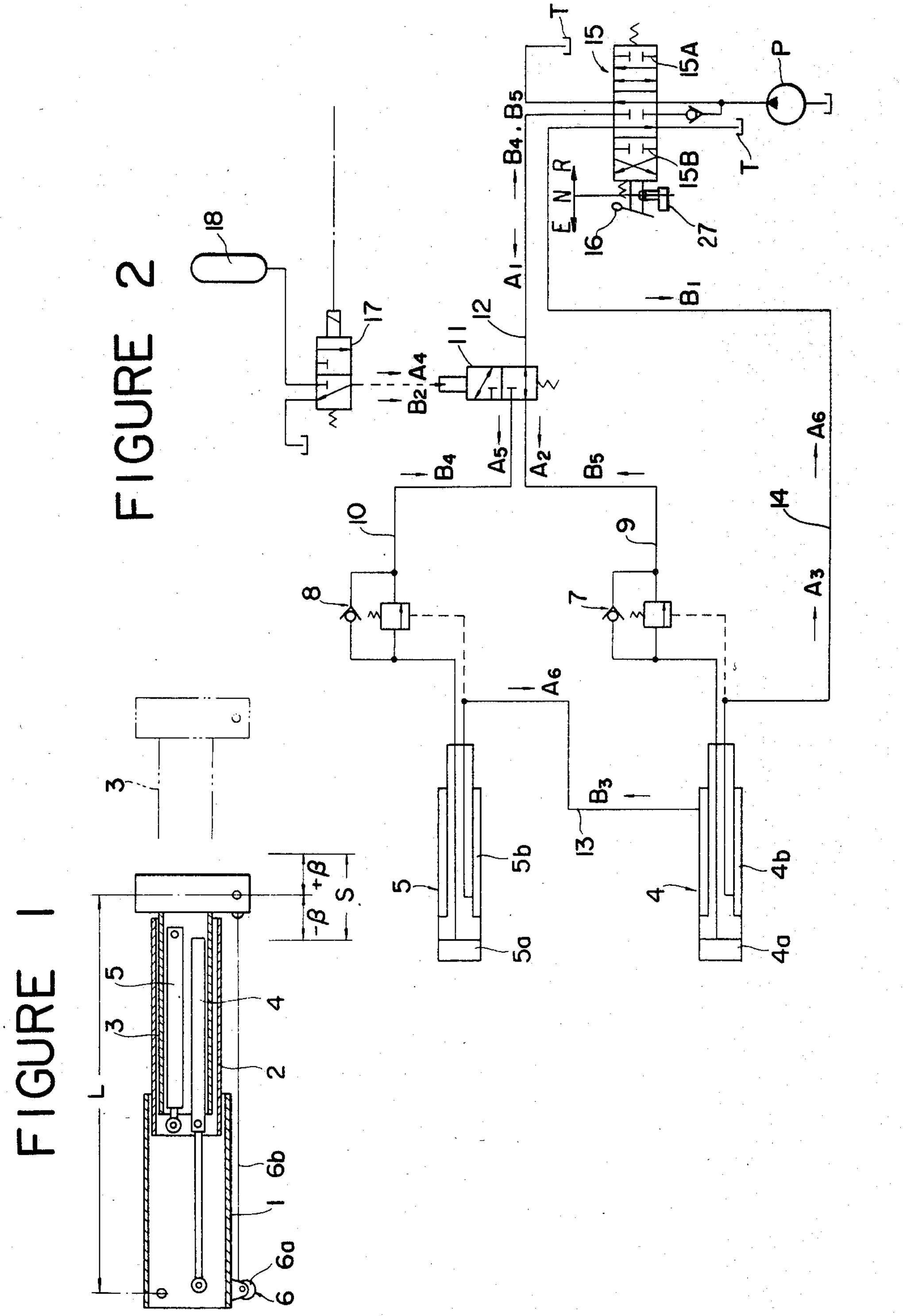
FIG. 1 is a schematic sectional view of a multistage telescopic boom.
FIG. 2 is a diagram of a hydraulic circuit employed for carrying out the present invention.

Referring to FIG. 1, there is shown an example of a multistage (three-stage) boom including a fore boom portion 3 which is telescopically fitted in an intermediate boom portion 2 and which is, in turn, telescopically fitted in a base boom portion 1. A first cylinder 4 for operating the intermediate boom portion 2 is provided between the base and intermediate boom portions 1 and 2, and a second cylinder for operating the fore boom portion 3 is provided between the intermediate and fore boom portions 2 and 3.

In an ideal control of this type of multistage boom, the first and second cylinders 4 and 5 are sequentially actuated to extend or contract the boom, switching operation from the first cylinder 4 to the second cylinder 5 or vice versa exactly at the point in time when the intermediate boom portion 2 is fully extended relative to the base boom portion 1 or when the fore boom portion 3 is fully contracted relative to the intermediate boom portion 2 as shown by solid line in FIG. 1. In this regard, it is to be noted that the actual boom length L at this point in time is constant.

Therefore, it is possible to control the timing of the switching operation of the cylinders 4 and 5 according to the output signal of a detector 6 which is provided on the multistage boom for detection of its length. In this connection, as the current travelling cranes with a rated lifting capacity greater than 3 tons are normally required to be equipped with an overload cautioning system, a boom length detector which is provided on most cranes along with such overload cautining system (not shown) can be utilized for the above-mentioned length detector 6. For example, the boom length detector 6 may employ a potentiometer which is mounted, via gears, on the axis of a wire winding drum of a spring-loaded wire retractor 6*a* to measure the length of a wire 6*b* to be pulled out when the boom is stretched, which is wound on the wire winding drum and which has its fore end securely fixed to a base end portion of the fore boom member 3 so that the wire is pulled out when the boom is extended.

In this instance, the boom length detector 6 can detect the boom length with a certain degree of accuracy in most cases, but its detected value inevitably contains an error of about $\pm 10$ cm. If the error is expressed by ($\alpha$), the detected value (l) of the boom which has actually a length L when in the position indicated in solid line in FIG. 1, is $$L-\alpha \leqq l \leqq L+\alpha$$

Therefore, switching operation of the cylinders 4 and 4, based solely on the detected alue (l), is quickened or delayed in timing as a result of the error ($\alpha$). In order to eliminate this problem, an arbitrary length ($\beta$) (e.g., of 20–50 cm) which is greater than the error ($\alpha$) is preselected in the present invention to determine a first reference value ($L-\beta$) which is the actual length of the boom in the position of FIG. 1 minus the just-mentioned preselected value ($\beta$), and a second reference value ($L+\beta$) which is the actual length L of the boom plus the preselected value ($\beta$), actuating the first cylinder 4 alone to extend or contract only the intermediate boom portion 2 if the detected value (l) of the detector 6 is smaller than ($L-\beta$) and actuating the second cylinder 5 alone to extend or contract only the fore boom portion 3 if the output value (l) of the detector 6 is greater than ($L+\beta$). Only when the output value (l) is in the range S between the first and second reference values ($L-\beta$) and ($L+\beta$), is switching of the cylinders 4 and 5 controlled on the basis of the variation per unit time of the detected value (l).

With regard to the switching point of the cylinders 4 and 5, it is necessary to consider that the boom length or the output value (l) of the boom length detector 6 is varied by the telescopic motion of the boom at a velocity ($\nu$) which is expressed by $$\nu = \lim_{\Delta t \to o} \frac{l(t + \Delta t) - l(t)}{\Delta t}$$

At the switching point of the cylinders 4 and 5, one cylinder which has been in operation comes to the stroke end and the velocity of the telescopic motion of the boom becomes zero. It follows that the cylinders 4 and 5 should be switched at a point in time when the velocity of the telescopic motion becomes zero.

Thus, according to the present invention, the variation per unit time of the output value (l), which represents the velocity ($\nu$) of the telescopic motion of the boom, is detected only when the output value (l) of the boom length detector 6 comes into the range S between the first reference value ($L-\beta$) and the second reference value ($L+\beta$). Telescope operation of the boom is continued while the value of variation is greater than a predetermined value, based on the assumption that the cylinder which is currently in operation has not yet reached the end of its stroke. As soon as the variation becomes smaller than a predetermined value (preferably equal to zero), the currently operating cylinder is assumed to have reached the end of its stroke, and the telescopic operation is switched to the cylinder of the next stage.

Figure 3:
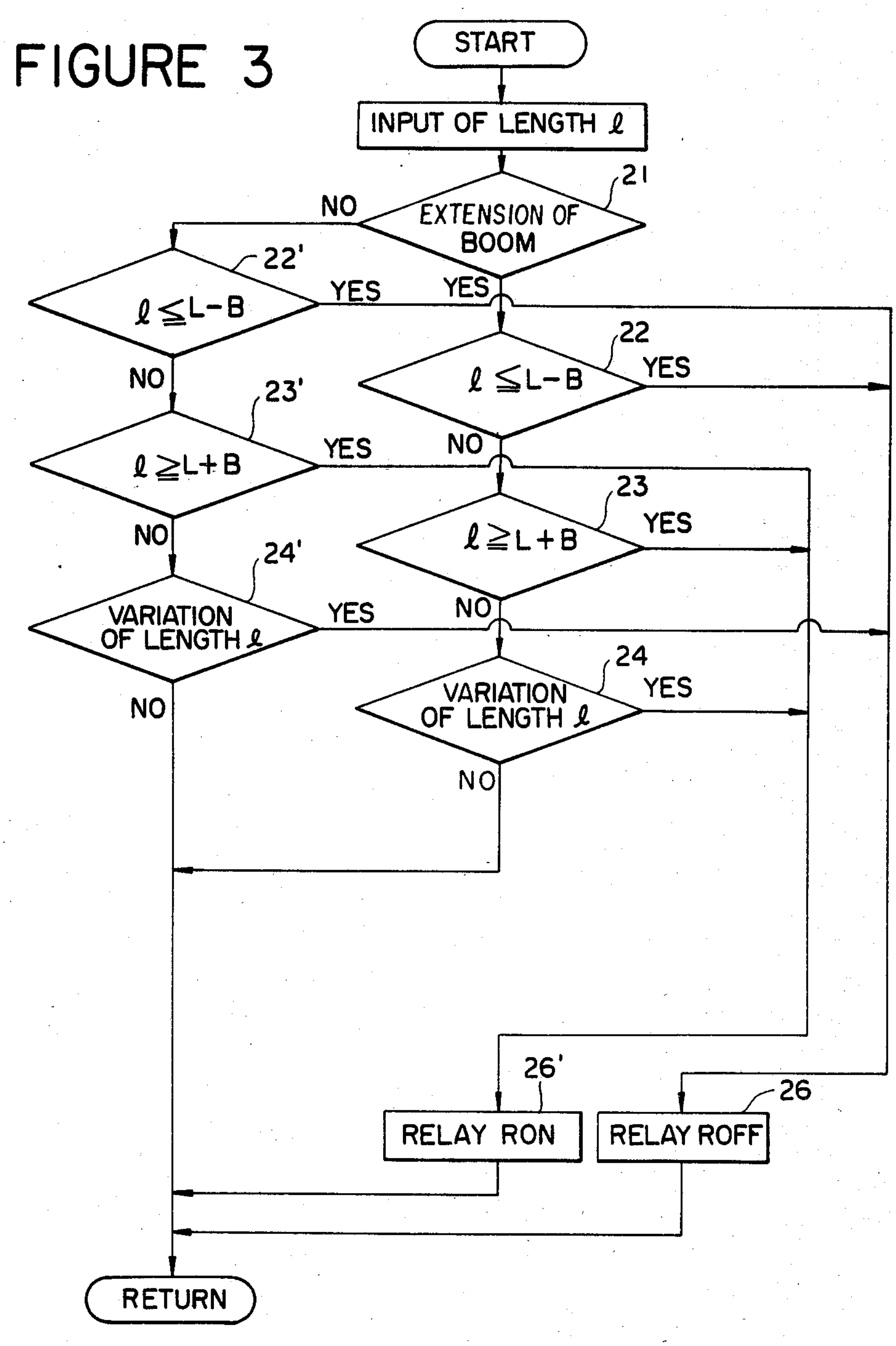
FIG. 3 is a flow chart of an exemplary electric circuit for controlling the shift of an electromagnetic circuit in the hydraulic circuit of FIG. 2.
Figure 4:
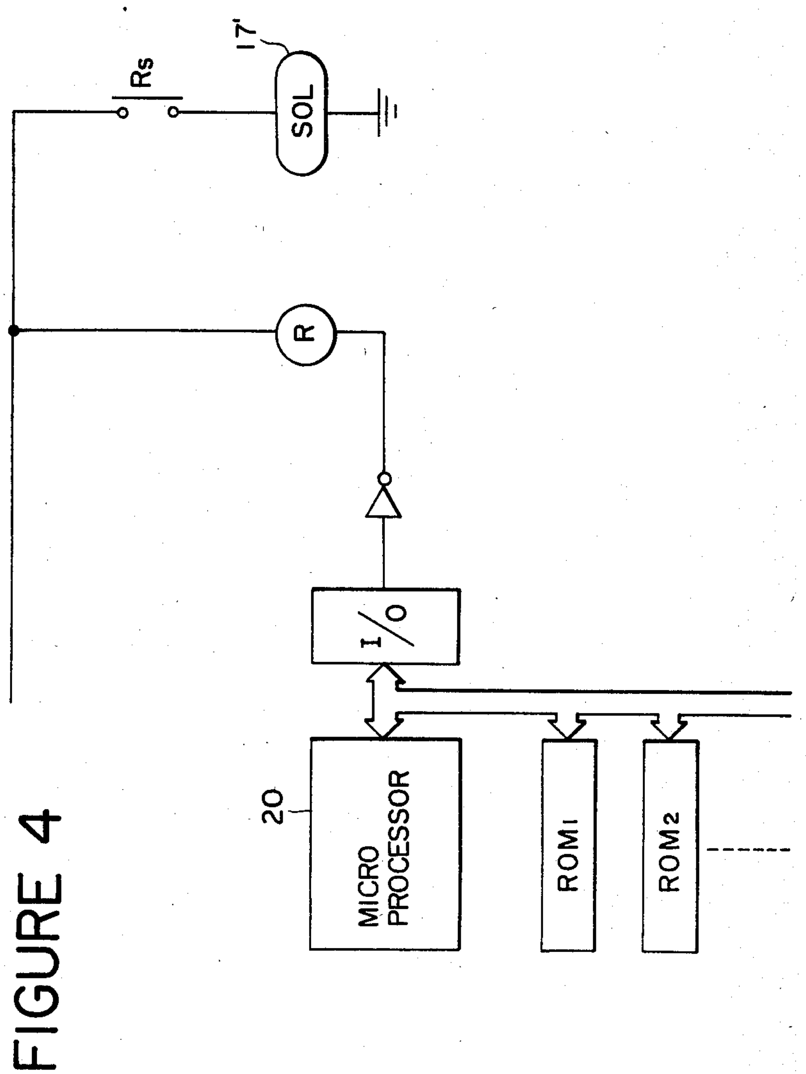
FIG. 4 is a diagram of a relay control system.

More particularly, the above-described control of the telescopic operation of the multistage boom can be attained by the use of a hydraulic circuit as shown in FIG. 2, the flow chart of FIG. 3 and the electric control circuit as shown in FIG. 4.

As shown in FIG. 2, boom extending fluid chambers 4*a* and 5*a* of the first and second cylinders 4 and 5 are separately connected to conduits 9 and 10 through counterbalance valves 7 and 8, respectively, and the conduits 9 and 10 are selectively connected to a main conduit 12 by a pilot change-over valve 11. On the other hand, the contracting oil chambers 4*b* and 5*b* of the first and second cylinders 4 and 5 are communicated with each other through an intermediate conduit 13 and connected to a main circuit 14 in parallel relation with each other. The main circuits 12 and 14 are selectively connectible either to a hydraulic pump P serving as a pressure source or to a tank T by the operation of a boom extension/contraction control valve 15 which switches the flow direction of the pressure medium to thereby extend or contract the cylinders 4 and 5. Indicated at 16 is an operating lever of the control valve 15 and at 27 a limit switch for detecting a neutral N position between an extension E and retraction R position.

As seen in the same figure, the pilot change-over valve 11 is connected to an accumulator 18 through an electromagnetic valve 17 which is actuated by an electric change-over signal from an electric control circuit as shown in FIG. 4 to thereby supply the pilot pressure from the accumulator 18 to the pilot change-over valve 11. Thereupon, the change-over valve 11 is switched to select either the extension or contraction of the cylinder 4 or 5.

The flow chart of FIG. 3 shows the step of utilizing the output value (l) of the boom length detector 6 during the telescopic boom extending or contracting operation for comparison with the above-mentioned preset first and second reference values ($L-\beta$) and ($L+\beta$) and the step of turning on or off a relay R according to the results of comparison. The control circuit is programmed as a control circuit of a microcomputer and incorporated into a microprocessor 20 as shown in FIG. 4. In this connection, it is advantageous to utilize the microprocessor which is already provided on a crane for the control of the overload cautioning device. Since such microprocessor is sequentially supplied with the output value (l) of the boom length detector 6 at predetermined time intervals, it can easily perform the operations of comparing the detected boom length (l) with the respective reference values and detecting the variation per unit time of the detected length (l), for the on-off control of the relay R, as shown in the flow chart of FIG. 3. Further, by the control circuit of FIG. 4, the switch Rs is turned on and off according to on-off control of the relay R to energize and de-energize the solenoid 17′, accurately switching the position of the electro-magnetic valve 17 of FIG. 2.

The telescopic boom extending and contracting operations are explained more particularly case by case as follows.

(I) Extending a boom from a fully contracted state:

In this case, the boom extension/contraction control valve 15 of FIG. 2 is switched to the right positon 15A in the same figure by manipulating the level 16, whereupon the output fluid pressure of the hydraulic pump P is fed inthe direction of arrow A1 and admitted into the pilot change-over valve 11. On the other hand, the output valve (l) of the tool length detector 6 is utilized in a manner illustrated in the flow chart of FIG. 3, more particularly, to step 21 of the flow chart to judge whether the boom is to be extended or contracted. In this instance, the boom is to be extended, so that the detected length (l) is utilized in step 22 through the step 21 for comparison with the first reference value (L−β).

Since the boom length is short in the initial stage of the boom extension and the detected value (l) is smaller than the first reference value (L−β), its signal is utilized in step 26 through step 22 to turn off the relay R of FIG. 4, de-energizing the solenoid 17′ and maintain the electromagnetic valve 17 and the pilot change-over valve 11 in the positions shown in FIG. 2. Therefore, the fluid pressure which is fed in the direction of arrow A1 is led in the direction of arrow A2 and admitted into the stretching oil chamber **4*a* of the cylinder 4, while the fluid pressure in the contracting oil chamber 4*b* of the cylinder 4 is led in the direction of arrow A3 to return to the tank T. As a result, the first cylinder 4 is extended so as to extend the intermediate boom portion 2 out of the base boom portion 1. At this time, the conduit 9 which is connected to the stretching oil chamber 5*a* of the second cylinder 5 is blocked by the pilot change-over valve 11, so that the second cylinder 5 remains at a standstill and the fore boom portion 3 is still held in contracted state in the intermediate boom portion 2 which is being extended out of the base boom portion 1**.

As the boom is extended to a certain extent and the detected length (l) becomes greater than the first reference value (L−β), the detected value (l) is utilized in step 23 for comparison with the second reference value (L+β). However the detected length (l) is still smaller than the second reference value (L+β) at this point in time, the detected value (l) is utilized in step 24 through step 23 to determine if the variation of the detected value (l) per unit time is greater than a predetermined value. Namely, at this point in time the control treats step 23 as if it were not included in the control sequence. As soon as the variation of the detected length (l) exceeds a predetermined value (which means that the first cylinder 4 has not yet reached the end of the stroke), the signal is returned to the initial point of control through step 24. Thus, there occurs substantially no change in control, and the electromagnetic valve 17 and pilot change-over valve 11 are continuously maintained in the position shown, permitting further extension of the intermediate boom portion 2 by the first cylinder 4 alone.

Then, if the variation per unit time of the detected length (l) becomes smaller than the predetermined value (with the first cylinder 4 at its stroke end), the signal is used in a relay-on step 26′ through step 24, turning on the relay R as shown in step 26′ and energizing the solenoid 17′ through the switch Rs to shift the electromagnetic valve 17 to the right position in FIG. 2. Consequently, the fluid pressure from the accumulator 18 is led in the direction of arrow A4 to shift the pilot change-over valve 11 into the upper position in the same figure, stopping the supply of fluid pressure to the first cylinder 4 and instead feeding the fluid pressure in the direction A5 from the main circuit 12 for admission into the extending fluid chamber **5*a* of the second cylinder 5. The fluid pressure in the contracting chamber 5*b* of the second cylinder 5 is drained in the direction of arrow A6 for return to the tank T. As a result, the first cylinder 4 is stopped with the intermediate boom portion 2 held in a fully extended position relative to the base boom portion 1, while the fore boom portion 3 alone is extended out of the intermediate boom portion 2 by the extension of the second cylinder 5**.

If the detected boom length (l) becomes greater than the second reference value (L+β) by further extension of the boom, the detected value (l) is used in step 26′ through step 23, holding the electromagnetic valve 17 in the right position in the figure to permit the extension of the fore boom portion 3 by the second cylinder 5 alone.

Namely, in the boom stretching operation, the intermediate boom portion 2 is firstly extended out of the base boom portion 1 by the first cylinder 4, and the electromagnetic valve 17 shifted when the first cylinder 4 comes to the end of its stroke, that is to say, when the intermediate boom portion 2 is fully extended, thereby extending the second cylinder 2 so as to extend the fore boom portion 3 out of the intermediate boom portion 2.

(II) Contracting the boom from a fully extended state:

In this case, the boom extension/contraction control valve 15 is shifted to the left position 15B in the figure to supply the output fluid pressure of the hydraulic pump P in the direction of arrow B1 into the contracting fluid chamber **4*b* of the first cylinder 4 to contract the same. However, since the boom is to be contracted in this instance, the output value (l) of the boom length detector 6 is used in step 22 through step 21 as shown in FIG. 3. The detected boom length is large and its detected value (l) is greater than the first reference value (L−β) and the second reference value (L+β) in the initial stage of the boom contracting operation, so that the detected value (l) is used in step 26′ through the NO and YES steps of steps 22′ and 23′, respectively, to turn on the relay R. Thereupon, the solenoid 17′ is energized to shift the electromagnetic valve 17 into the right position in FIG. 2, and the fluid pressure from the accumulator 18 is fed in the direction of arrow B2 to shift the pilot change-over valve 11 into the upper position, blocking the conduit 10 and instead connecting the conduit 9 to the main circuit 12**.

Therefore, the fluid pressure flowing in the direction of arrow B1 is fed in the direction of arrow B3 and admitted into the contracting fluid chamber **5*b* of the second cylinder 5, while the fluid pressure in the extending chamber 5*a* of the second cylinder 5 is drained in the direction of arrow B4 and returned to the tank T. Consequently, the first cylinder 4** remains at a standstill with the intermediate boom portion 2 in a fully extended state relative to the base boom portion 1, retracting only the fore boom portion into the intermediate boom portion by the contraction of the second cylinder 5.

If the boom is contracted to a certain extent and the detected length (l) becomes smaller than the first reference value (L+β), the detected value (l) is used in step 24' through step 23 to check if the variation per unit time of the detected length (l) is greater than a predetermined value. If the variation is greater than the predetermined value (implying that the second cylinder 5 has not yet reached its stroke end), the signal is returned to the initial point of control through step 24'. Therefore, the electromagnetic valve 17 is continuously retained in the current position, continuing only the retraction of the fore boom portion 3 by the second cylinder 5.

As soon as the variation per unit time of the detected length (l) becomes smaller than the predetermined value (with the second cylinder 5 coming to its stroke end), the signal is used in step 26 through step 24, returning the electromagnetic valve 17 to its initial change-over position. As a result, the conduit 9 is blocked by the change-over valve 11 to stop the fluid in the extending chamber 5*a* of the second cylinder 5 from draining into the tank T, holding the second cylinder 5 at a standstill. Then, the fluid pressure which is fed in the arrowed direction B1 is admitted into the contracting chamber 4*b* of the first cylinder 4, while the fluid pressure in the extending chamber 4*a* of the first cylinder 4 is led out in the direction of arrow B5 for return to the tank T. Thus, the first cylinder 4 is contracted to retract the intermediate boom portion 2 into the base boom portion 1, along with the fore boom portion 3 which is held in a fully retracted position in the intermediate boom portion 2.

Thereafter, as the detected length (l) becomes smaller than the first reference value (L−β) by further contraction of the boom, the detected value (l) is used in step 26 through step 22' to hold the electromagnetic valve 17 in the initial position shown, so that the intermediate boom portion 2 is retracted into the base boom portion 1 by the first cylinder 4 alond with the fore boom portion 3.

It will be clear from the foregoing description that, in the boom contracting operation, the fore boom portion 3 is firstly retracted into the intermediate boom portion 2 by the second cylinder 5 with the electromagnetic valve 17 in the shifted position, and it is only when the second cylinder 5 reaches its stroke end, that is to say, when the fore boom portion 3 is fully contracted, that the electromagnetic valve 17 is returned to its initial position to retract the intermediate boom portion 2 into the base boom portion 1 by retraction of the first cylinder 4.

(III) Stretching or retracting the boom after once stopping the same halfway through the extending operation:

In case the output valve (l) of the boom length detector 6 is smaller than the first reference value (L−β) at the time of re-starting the telescopic motion, the detected signal is used in step 26 through steps 22 or 22' to hold the electromagnetic valve 17 and pilot change-over valve 11 in the positions shown. Therefore, the second cylinder 5 remains in a de-actuated state and only the first cylinder is actuated to extend or retract the intermediate boom portion 2 relative to the base boom portion 1. On the other hand, if the detected value (l) is greater than the second reference value (L+β), the detected signal is used in step 26' through steps 23 or 23' to shift the electromagnetic valve 17 into the right-hand position and the pilot change-over valve 11 into the upper position in the figure. Accordingly, the first cylinder remains at a standstill, and only the second cylinder is actuated to extend or retract the fore boom portion 3 relative to the intermediate boom portion 2.

During the above-describe telescopic boom extending or contracting operation, if an operator should stop the telescopic motion by intentionally returning the operation control valve 15 to a neutral position when the boom length is close to the cylinder switching point, namely, when the detected length (l) is in the range of (L−β)≦l≦(L+β), the steps 24 or 24' of the flow chart of FIG. 3 is under the impression that there is no variation in the detected length (l) although the operating cylinder has not yet reached the end of its stroke, turning on or off the relay R to shift the electromagnetic valve 17 to the right or left position. Therefore, upon re-starting the telescopic operation of the boom, control is recommenced from the point in time at which the electromagnetic valve 17 was switched, proceeding to the extension or contraction of the cylinder of the next stage with the cylinder of the prior stage left in a position short of its stroke end.

Figure 5:
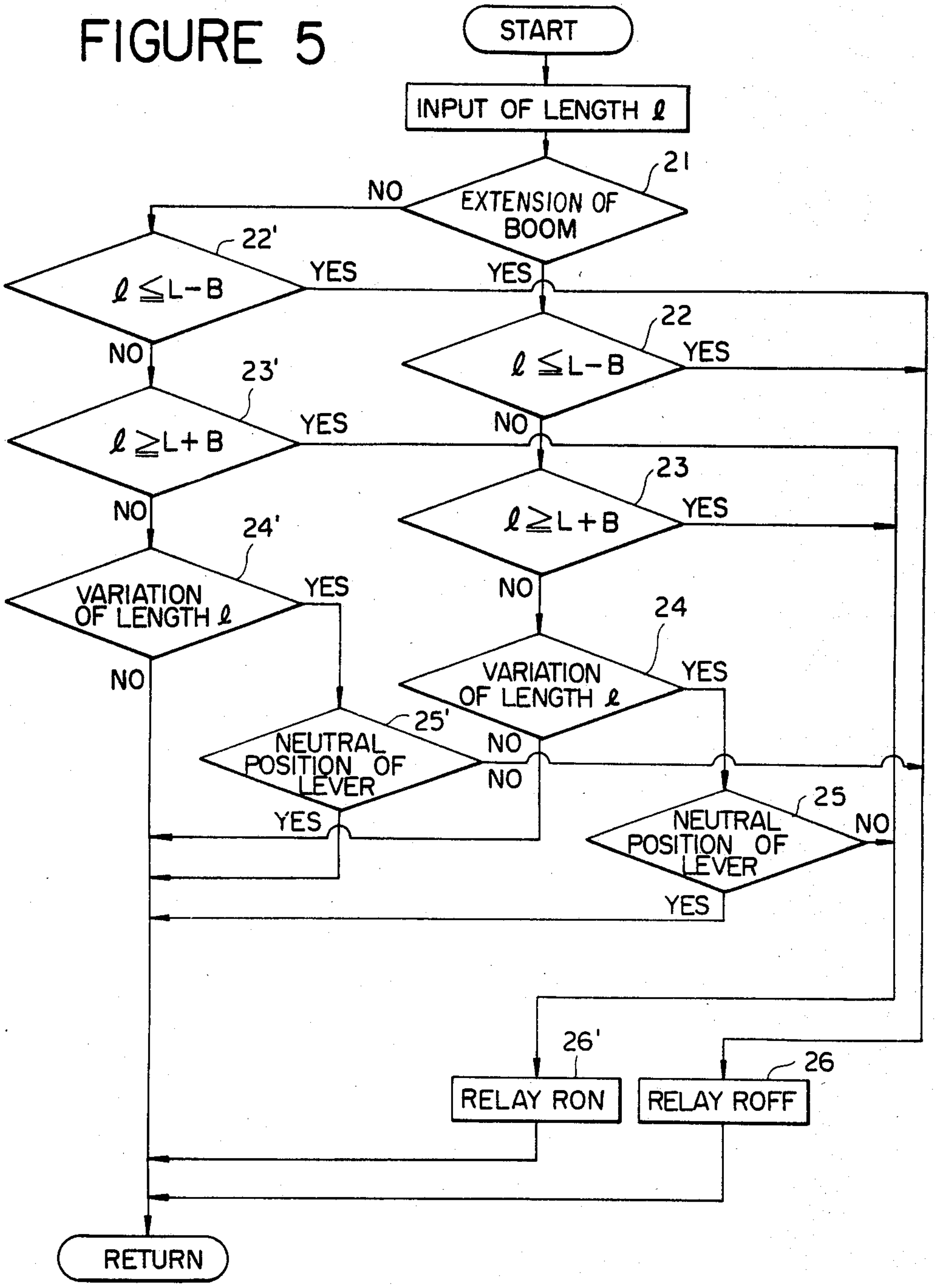
FIG. 5 is a view similar to FIG. 3 but showing a modified form of the electric control circuit.

This can be prevented by providing a limit switch which detects movement of the lever 15 of the operation control valve 15, thereby detecting whether or not the lever 16 is in its neutral position. Further, as illustrated in FIG. 5, steps 25 and 25' which discriminate the neutral position of the lever 16 are used in steps 24 and 24' which judge the variation of the detected length (l), respectively. In this instance, even if the boom is initially stopped at a halfway position as described above, there occurs no shifting of the electromagnetic valve 17 and a controllable state prior to the temporary stopping is retained. Upon subsequently recommencing the extension or contraction of the boom control is started according to the particular situation at the time of recommencement, so that the boom extending or contracting operation can be invariably controlled under optimum conditions to ensure accurate operation.

It will be appreciated from the foregoing description that, according to the method of the present invention, the respective cylinders are successively operated by an accurate switching operation to stretch or contract a boom under ideal conditions. Besides, the method of the invention can be applied in an extremely economical manner since it can utilize a boom length detector which is normally provided on a multistage boom, without necessitating changes in the boom and cylinder constructions. The switching function is performed only in a predetermined range before and after a cylinder switching point L without resorting to a mechanical detection mechanism to guarantee accurate control of the switching operation.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a plurality of boom operating cylinders in extending and contracting operations of a multistage telescopic boom including a boom length detector, a base boom portion, an intermediate boom portion and a fore boom portion, said method comprising:

detecting the length of said telescopic boom by means of said boom length detector;

permitting selective extension or contraction of a cylinder of said intermediate boom portion when the value (l) of a detected length is smaller than a first preset reference value (L−β) which is determined by subtracting a predetermined arbitrary length (β) from an actual length L of said boom when said intermediate boom portion is fully extended relative to said base boom portion and said fore boom portion is fully contracted relative to said intermediate boom portion;

permitting extension or contraction of a cylinder of said fore boom portion alone when the detected value (l) is greater than a second predetermined reference value (L+β);

detecting whether a variation per unit time of said detected value (l) is in a range between said first and second reference values (L−β) and (L+β);

continuing boom extension or contraction of a currently operating cylinder when said variation is greater than a predetermined value; and switching boom extending or contracting operation to a cylinder of a said fore boom portion or said intermediate portion at a point in time when said variation becomes smaller than said predetermined value.

2. The method as defined in claim 1, further comprising determining said first and second reference values (L−β) and (L+β) so as to cover errors in detection of said boom length detector.

3. The method as defined in claim 1, which includes an electric control circuit including a logic circuit connected to said boom length detector and which further comprises;

controlling the cylinders of said fore and intermediate boom portions by a hydraulic control circuit utilizing a pilot change-over valve and an electromagnetic valve and which includes the steps of controlling the flow of fluid pressure via said pilot change-over valve to and from extending and contracting pressure chambers of said cylinders and controlling via said electromagnetic valve the supply of pilot pressure to said pilot change-over valve; comparing via said electric control circuit, including said logic circuit connected to said boom length detector, said detected value (l) with said first and second reference values (L−β) and (L+β) and energizing and de-energizing said electromagnetic valve when said variation per unit time of said detected length (l) becomes smaller than said predetermined value in boom extending and contracting operations, respectively.

4. The method as defined in claim 3, wherein said logic circuit of said electric control circuit includes a neutral position detector and wherein the method further comprises retaining a controllable state via said neutral position detector when an extension/contraction selector lever is put in a neutral position halfway of an extending or contracting stroke of said cylinders.

5. The method as defined in claim 1, wherein said boom length detector includes a wire wound on a drum of a wire retractor mounted on said base boom portion and having the fore end thereof fixed to the rear end of said fore boom portion, and a potentiometer and which further comprises measuring via said potentiometer the length of said wire to be pulled out during the boom extending and contracting operations.

* * * * *